United States Patent [19]

McLaughlin et al.

[11] Patent Number: 4,881,308

[45] Date of Patent: Nov. 21, 1989

[54] METHOD OF TERMINATING LEAD FILLED CAPACITOR

[75] Inventors: William McLaughlin; Doug Lee; Ricardo Garcia, all of Myrtle Beach, S.C.

[73] Assignee: AVX Corporation, Great Neck, N.Y.

[21] Appl. No.: 214,513

[22] Filed: Jul. 1, 1988

[51] Int. Cl.$^4$ ............................................. H01G 4/30
[52] U.S. Cl. ..................................... 29/25.42; 29/851;
264/61; 361/304; 361/305; 361/321
[58] Field of Search ....................... 29/25.42, 825, 851;
427/96, 123–125, 79, 81; 361/305, 305, 321
264/61

[56] References Cited

U.S. PATENT DOCUMENTS

| | | | |
|---|---|---|---|
| 3,965,552 | 6/1976 | Rutt | 29/25.42 |
| 4,241,378 | 12/1980 | Dorrian | 29/25.42 X |
| 4,652,967 | 3/1987 | Sakabe et al. | 29/25.42 X |

Primary Examiner—Carl E. Hall
Attorney, Agent, or Firm—Arthur B. Colvin

[57] ABSTRACT

A method of manufacturing a ceramic capacitor of the lead filled type includes coating the ends of the ceramic monolith with a terminating paste incorporating oxidizable metal particles characterized in that the lead will not wet to oxides of the metals but will wet to unoxidized or lightly oxidized increments of the metals. The paste is fused in an oxidizing environment or is fused in an inert environment and thereafter heated in an oxidizing environment with the result that the metal increments adjacent the exterior of the fused coating are oxidized whereas the metal at the interior portions of the paste are unoxidized or only slightly oxidized. Upon metal injection, the lead will wet to the interior portions of the fused paste but will not wet to the exterior of the paste whereby injected chips may be readily separated and whereby the size of the chip is rendered predictable due to the absence of adherent lead.

5 Claims, 1 Drawing Sheet

METHOD OF TERMINATING LEAD FILLED CAPACITOR

BACKGROUND OF THE INVENTION

1. Field of the Invention

The present invention is directed to an improved method of manufacturing ceramic capacitors of the lead filled type and to the resultant capacitors.

2. The Prior Art

It is known from U.S. Pat. Nos. such as 3,679,950; 3,879,645; and 3,965,552, by way of example, to form a ceramic capacitor which eliminates the need for using noble metals such as platinum, paladium, and the like. Prior to the method as set forth in the noted patents, ceramic capacitors were fabricated by inter-leaving green ceramic sheets with electrode areas comprised of metals capable of withstanding the sintered temperatures to which the capacitors are subjected.

In accordance with the noted patents, ceramic capacitors are formed by first forming a monolithic ceramic block having void areas exiting to end portions of the block which void areas correspond to the intended location of the capacitor electrodes. Thereafter, the void areas are filled with lead to form the electrode. Void areas are formed by introducing between the green ceramic sheets layers of organic material which are burnt out in the course of heating the green ceramic material.

Capacitors of the type described have presented significant problems in their manufacture. One such problem arises as a result of the tendency of the molten lead which is forced into the void areas to immediately run out of the voids as soon as the ceramic members are removed from the molten lead bath and depressurized.

In accordance with one proposed means of solving the lead run-out problem the ends of the ceramic monoliths were coated with a porous frit and lead is forced through the frit to fill the void areas. The difficulty with this method is that if the frit is dense and of limited porosity it is difficult to insure that the entirety of the void areas will be filled with lead with the result that the capacitance of the resultant device is unpredictable. In the event that a highly porous frit is employed, substantial lead run-out is unavoidable. Where a relatively dense frit is employed, it is necessary, in order to make contact with the buried electrodes, to grind away portions of the frit to expose the lead at the end surfaces.

In order to minimize lead run-out without resorting to covering the ends of the monolith with a dense and limited porosity frit, it has been proposed to incorporate increments of silver in the frit composition. The silver tends to prevent the lead from flowing outwardly through the frit, this tendency apparently resulting form the fact that the lead can wet to the silver. The silver frit combination does not provide a satisfactory solution to the termination problem of capacitors of the lead filled type, since the silver components are readily dissolved in the lead with a result that the silver in the frit is leached from the frit leaving external frit areas which are not electrically connected to the internal electrodes.

Attempts have been made to incorporate in the frit materials which are wet by the lead, but which are not soluble in the lead. By this means it is possible to impregnate the ceramic monoliths while eliminating the tendency of the impregnating lead to flow outwardly from the monolith. A difficulty inhering in the use of such lead wettable but non-soluble additions to the frit composition resides in the fact that increments of the lead wet not only internally to the deposited electrodes, but also adhere to the exterior of the frit. As a result of the tendency of lead to accumulate on the exterior of the termination frit, the ceramic chips tend to adhere one to the other. In order to avoid such adhesion, it is necessary to subject the impregnated monoliths to violent jogging while the same remain at a temperature above the melting point of the lead.

As will be readily recognized, jogging of a batch of impregnated chips is disadvantageous in that a substantial amount of breakage and cracking is experienced. Also, increments of lead are retained on the external surfaces of the frit of the separated chips with the result that the physical outline of the chip is largely unpredictable.

One attempted means of solving the termination problem of lead filled capacitors is set forth in U.K. application 2,199,571A, and European Patent application 0,092,912. In accordance with such applications, the ceramic capacitor bodies have their end portions covered with a frit mixture comprised of large sized ceramic particles coated with silver and glass frit. The frit mixture is fused to form porous end coatings. Thereafter the end coating are sulphided and the chips lead impregnated. The sulphiding step is said to prevent the silver from leaching out in the lead bath while still permitting the lead to wet to the silver sulphide sufficiently to prevent lead run-out. The solution proposed by the above noted patents is unsatisfactory since, by virtue of the tendency of the lead to wet to (although not dissolve) the silver sulphide, large increments of lead coat the external surfaces of the frits. It thus remains necessary to violently jog the capacitors to procure separation, and the resultant capacitors are of unpredictable dimensions as a result of excess adherent lead. It may here be observed that it is highly desirable that the exterior dimensions of ceramic capacitors be tightly controlled since, in use, such capacitors are often fed by automatic machinery and the handling of the capacitors by such machinery is in turn dependant upon the capacitors being accurately sized.

U.S. Pat. No. 4,652,967 represents a further attempt to solve the problem of terminating lead filled capacitors. In accordance with this reference a porous frit includes a paste made of $Ni_3B$. This material is said to wet to the lead and thus retain the lead within the void areas and yet not be leached out in the course of immersion in the lead bath. Thereafter a conductive covering layer is applied over the frit areas of the impregnated ceramic. The noted reference fails, however, to avoid the problems of adhesion of the impregnated capacitors and the tendency of lead increments to stick to external surfaces of the frit with the result that violent jogging is necessary, and size variations due to adherent lead still result.

SUMMARY OF THE INVENTION

The present invention may be summarized as directed to an improved method for terminating capacitors of the lead filled type, and to the resultant product. In its broadest aspects, the invention involves applying to the ends of a ceramic monolith having internal void areas to be filled by electrode material a porous termination frit which includes inner areas adjacent the voids which include metallic components which are readily wet by the molten lead used to fill the void areas. A frit, at its exterior surfaces is comprised of a composition which is not wettable by the lead whereby there is virtually no tendency for the lead to stick to the exterior surfaces. Still more specifically, the method of the present invention involves applying a frit comprised of porous material and glass to the ceramic monolith prior to filling. The frit includes a metal preferably selected from the group consisting of copper, nickel, and silver or combinations thereof. A characterizing feature of the present invention involves a preferential oxidation of the metal, with metal disposed adjacent exterior portions of the frit highly oxidized and metal components adjacent the body of the chip retained in a pure state or a lesser oxidized state. This result can be achieved either by fusing the frit containing the metal in an oxygen free environment and thereafter re-heating in air or by effecting fusion of the frit in air.

As a result of the oxidizing treatment the impregnated chips, when removed from the molten lead bath, tend to retain the lead within the void areas since the lead wets to the non-oxidized or slightly oxidized internal metal components of the frit. However, there is virtually no tendency of the lead to wet to the oxidized metal components adjacent the exterior of the capacitor. As a result, capacitors emerging from the molten metal may be readily separated by gentle jogging. Importantly, since there is virtually no tendency for the lead to adhere to the external portions of the capacitor body or the non-wettable external surfaces of the frit, the capacitor will exhibit a predictable size free of adherent lead. Electrical contact to the conductive materials in the frit is thereafter effected by any of a number of conventional metalizing steps such as plating, sputtering, or vapor deposition. The resultant, predictably sized chips are suitable for automated feeding. Since minimal jogging is necessary to secure chip separation, the danger of damage to the chips is substantially reduced.

It is accordingly an object of the present invention to provide an improved method of terminating chip capacitors of the lead filled type. A further object of the invention is a provision of a method of the type described wherein prior to lead filling there is applied to the capacitor ends a fused termination layer characterized in that the internal portions of the layer abutting the opening of the voids in the ceramic block incorporate a material which is readily wet by the injected lead, whereas the external surfaces of the fused frit are non-wettable or slightly wettable by lead.

Still a further object of the invention is the provision of an improved capacitor manufactured by the method set forth hereinabove. Capacitors in accordance with the invention may be of precisely predetermined size characteristics since there is virtually no tendency for lead to collect on the external surfaces of the termination, and such minor amounts that may collect are removed by gentle jogging. Freedom of the exterior surfaces of the capacitors from components readily wet by lead has the further advantage of enabling the minimizing or elimination of the jogging step heretofore required to separate lead filled capacitors. By minimizing jogging, chipping and like damage to the capacitors is similarly reduced.

BRIEF DESCRIPTION OF DRAWINGS

Referring now to the drawings which are schematic in nature.

DETAILED DESCRIPTION

Figure 1:
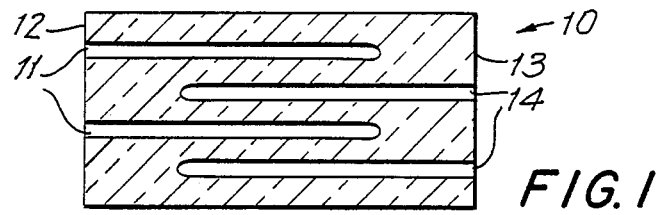
FIG. 1 is a sectional view through a ceramic capacitor body prior to lead filling.

As diagrammatically disclosed, FIGS. 1 through 5 of the drawing illustrate the ceramic capacitor components at the various stages of their manufacture. In FIG. 1 there is disclosed a sintered ceramic body 10 comprised of barium titanate or a like ceramic, known per se, having a high dielectric constant. The capacitor body 10 may be manufactured in accordance with the procedures set forth in U.S. Pat. No. 3,965,552. By way of example the ceramic body member 10 includes void areas 11 extending inwardly of the body from one end portion 12. The void areas 11 approach but do not extend to the opposite end 13 of the body. In similar fashion, void areas 14 extend inwardly from end 13 of the body the void areas 14 terminating short of end 12 of the body.

As is well known in the art, the void areas 11 and 12 are ultimately to be filled with electrode material normally comprised of lead. The electrode material as noted in the above referenced U.S. Pat. No. 3,965,552 is typically injected into the interior of the voids 11 and 14 by immersion of the capacitors in a bath of molten lead which is subjected to super atmospheric pressures. The lead is forced into the voids and forms electrodes.

Due to the tendency of the lead, upon removal from the bath and release of atmospheric pressure, to flow outwardly from the voids, it is known to cover the ends 12, 13 of the ceramic body prior to lead injection with a porous ceramic layer (see U.S. Pat. No. 3,965,552). The porous layer permits the lead to flow to the interior of the voids but acts to prevent the lead from outwardly flowing when the chips are removed from the bath and returned to atmospheric pressures. However, the noted procedure requires that the porous ceramic end portions be ground away to expose the ends of the injected lead for termination.

Figure 2:
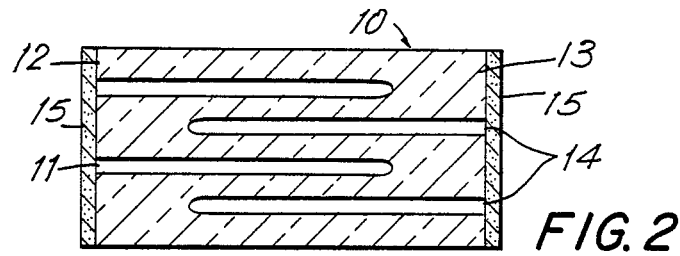
FIG. 2 is a sectional view of the capacitor of FIG. 1 after application of the porous frit material.

In accordance with the present invention, and referring particularly to FIG. 2, there is applied to the ends 12, 13 in covering relation of the exits of the voids 11 and 14 a termination paste layer 15. The termination paste layer 15 in accordance with the invention comprises a paste which when fused will form a porous mass through which molten lead under pressure may be readily forced. Whereas typical termination pastes are comprised of a mixture of ceramic particles, low melt glass frit, and noble metal such as paladium, platinum, gold, silver, etc., such termination frits have the disadvantage, (in addition to high cost) of being readily wettable by the injected lead. As a result, after impregnation substantial quantities of the lead will adhere to the exterior surfaces of the applied frit necessitating substantial jogging at elevated temperatures to separate individual capacitors. Additionally, even after jogging, substantial quantities of lead will adhere to the exterior surfaces of the frit resulting in capacitors whose physical dimensions are unpredictable.

In accordance with the present invention the frit layer 15 is comprised of a mixture including a glass frit and a readily oxidized metal. Preferably the metal is selected from the group consisting of copper, nickel and combinations of silver with copper and nickel. The invention, however, is not to be limited to these specific metals since numerous metallic compositions which fulfill the requirement that they be wettable to lead but that their oxides not be wettable to lead may be substituted for the metals of the formulas given below without departing from the spirit of the invention. By way of example and without limitation, two preferred frit formulations are given below.

EXAMPLE I

65% by weight nickel powder
0.6% Boric Acid
4.1% Cadmium Oxide
6.7% Bismuth Trioxide
0.5% Silica
4.1% BCA (2-2-Butoxyethoxy Ethyl Acetate)
19% binder in an organic vehicle, illustratively 5% Ethyl Hydroxy Ethyl Cellulose, 15% gum, 5% wax, 75% of a mixture of approximately equal parts Butyl Cellusolve and Butyl Carbitol Acetate.

EXAMPLE II

65–70% Copper powder
0.6% Boric Acid
2–4% Cadmium Oxide
3–7% Bismuth Trioxide
0.2–0.5% Silica
4.1% BCA (2-2-Butoxyethoxy Ethyl Acetate)
19% binder in an organic vehicle, illustratively 5% Ethyl Hydroxy Ethyl Cellulose, 15% gum, 5% wax, 75% of a mixture of approximately equal parts Butyl Cellusolve and Butyl Carbitol Acetate.

The frit formulations are applied as a paste layer 15 to the ends 12,13 of the capacitor body. The capacitor bodies with frit layer 15 applied thereto are then heated in an air atmosphere in a continuous belt furnace to a peak temperature of from 750 to 800 degrees centigrade, being maintained at such temperatures for from 2 to 10 minutes, total cycle time being from about 15 to 45 minutes. The time period may be varied somewhat in accordance with the frit formulation used, noting however that if heating is protracted for an unduly long period, the metallic components of the paste will become oxidized throughout their entire extent and wetting of the lead to the internal components of the frit at the ends 12, 13 will be incomplete. At the other extreme, if the frit is heated in the air environment for an inadequate period of time the external exposed surfaces of the frit will remain wettable by the injected lead and the advantages of the instant invention will not be completely realized.

As an alternate procedure, fusing of the frit may be effected in an oxygen free environment and the chips thereafter heated in air or like oxidizing environment.

Figure 3:
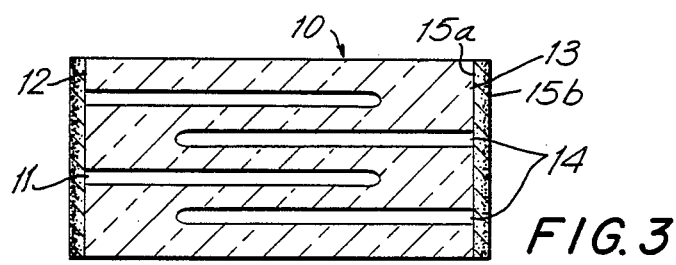
FIG. 3 is a sectional view of the capacitor body FIG. 2 after oxidation of the frit.

There is shown in FIG. 3 an idealized condition wherein the portion 15A of the frit is disclosed as having minimal oxidized metal components (light areas) whereas the exterior components 15B of the frit include primarily metallic components which have been oxidized (dark areas) and hence rendered non-wettable by lead.

Figure 4:
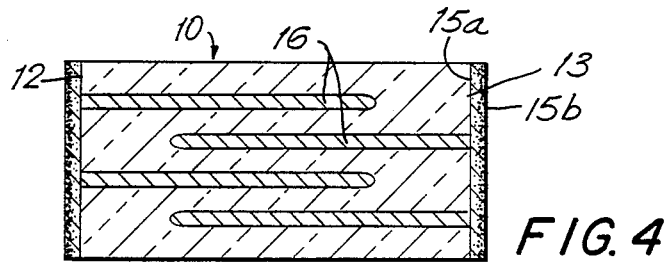
FIG. 4 is a sectional view of the capacitor of FIG. 3 after lead impregnation.
Figure 5:
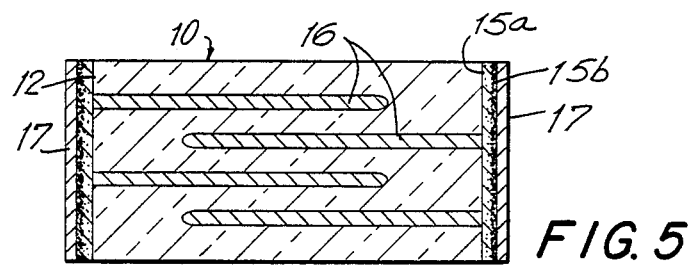
FIG. 5 is a cross-sectional view of the capacitor of FIG. 4 after application of a metal terminating coating.

In FIG. 4 there is disclosed the capacitor body of FIG. 3 after the same has been subjected to lead injection. As is apparent from FIG. 4 the voids 11 and 14 have been filled with lead or lead alloys 16 the lead having been forced through the porous frit layers 15 which were previously fused to the end surfaces of the capacitor body by the heating and oxidizing step(s) described. Lead injection is accomplished in known manner, suitable procedures for effecting such injection involving placing the members in a wire basket disposed within a sealed container above a batch of molten lead. The pieces are heated to 320 centigrade. When this temperature is reached, the pressure in the chamber is lowered to about 0.0013 atmospheres. The basket is then immersed in molten lead and the pressure in the chamber raised to 23.8 atmospheres for 30 seconds. The basket is removed from the lead and jogged lightly for about five seconds. The pressure in the chamber is released after the parts have cooled below 260 centigrade. The resultant parts exhibit virtually no tendency to adhere together and the surfaces of the parts are essentially entirely free of any lead coating.

The frit components 15 are thereafter overcoated to provide a metallic surface to which solder connections may be effected. The coating 17 appearing in FIG. 5 may be applied by any standard metal deposition process. By way of example a standard electrolytic nickel plating process may be employed to deposit from about 0.6 to 7.5 microns of nickel followed by a standard tin-lead plating process which deposits a similar thickness of 90% tin and 10% lead. Alternate metalizing procedures such as vapor deposition and or sputtering may be employed to overcoat the terminations to provide a solderable connection.

As will be apparent from the foregoing description, the present invention is directed to a method of terminating the so called lead filled capacitors by providing a porous end covering characterized in that the interior of the covering or termination is wettable by the injected lead to a far greater degree than the exterior surface. In accordance with the invention, the variation in wettability is effected by oxidizing the frit in such manner that oxidation is more prevalent adjacent the exterior of the frit than at the interior.

While in the described example the frit is fused in an air environment whereby fusing and oxidation occurs simultaneously, it is of course feasible to first fuse the frit in an inert environment and thereafter subject the fused frit to the oxidizing influences. The latter procedure is sometimes preferable since it limits to a somewhat greater degree the oxidation effects to the exterior portions of the frit thereby assuring improved wetting of the lead to the interior-most portions of the frit layer.

As will be apparent from the preceding disclosure, numerous variations may be made without departing from the central theme of the instant invention which is considered to be directed to a termination method wherein a porous terminating frit is rendered non-wettable by oxidation at its exterior surfaces but remains wettable at the interior surfaces thereof.

Having thus described the invention and illustrated its use what is claimed is:

1. In the method of manufacturing a ceramic capacitor of the lead filled type from a ceramic monolith having a plurality of electrode receiving voids, alternate said voids extending to opposite ends of the monolith, the improvement which comprises coating said ends of said monolith with a termination paste comprised of frit and at least one metal subject to oxidation when heated in an oxidizing environment, the selected metal being characterized in that the metal is wettable by lead and the oxide of such metal is essentially non-wettable by lead, heating said monolith to fuse said frit, causing said coating to be exposed in heated condition to an oxidizing environment for a time sufficient to substantially oxidize the metal components of said paste adjacent the surface of said coating while metal components in the portions of said coating remote from said surfaces remain in an unoxidized or lesser oxidized condition, thereafter injecting lead into the interior of said voids through said coating, and thereafter applying a conductive metallic layer over said coating.

2. The method in accordance with claim 1 wherein the metal component of said paste consists of one or more of the metals selected from the group consisting of copper, nickel and silver.

3. The method in accordance with claim 1 wherein said paste is heated in an oxidizing environment simultaneously to fuse said frit and oxidize said metal component in said paste adjacent to surface of said coating.

4. Method in accordance with claim 1 wherein said paste is fused in an oxygen free environment and said monolith incorporating the fused paste is thereafter heated in an oxidizing environment to induce oxidation of the metal components of said fused paste adjacent the exterior of said fused paste while retaining increments of the metal components of said fused paste adjacent said monolith substantially free of oxidation.

5. In the method of manufacturing a ceramic capacitor of the lead filled type from a ceramic monolith having a plurality of electrode receiving voids, alternate said voids extending to opposite ends of said monolith, the improvement which comprises covering said ends of said monolith with a termination paste comprising a glass frit and a metal selected from the group consisting of copper and nickel, heating said monolith in a oxidizing environment to fuse said frit and cause the metal components at the exterior exposed surfaces of said paste to oxidize, the metal components at the interior of said paste remaining unoxidized or in lesser oxidized condition than the metal adjacent the exterior surfaces of said paste, thereafter injecting electrodes comprised of molten lead into the interior of said monolith to substantially fill said voids, and thereafter applying a conductive coating over the surface of the fused paste.

* * * * *